United States Patent
Otanez et al.

(10) Patent No.: US 12,151,687 B2
(45) Date of Patent: Nov. 26, 2024

(54) VEHICLE SPEED AND/OR WHEEL SPEED ESTIMATION USING MULTIPLE SPEED MEASUREMENTS

(71) Applicant: GM GLOBAL TECHNOLOGY OPERATIONS LLC, Detroit, MI (US)

(72) Inventors: Paul Guillermo Otanez, Franklin, MI (US); Cameron Christopher Rose, Farmington Hills, MI (US); Jordan Billet, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 326 days.

(21) Appl. No.: 17/712,808

(22) Filed: Apr. 4, 2022

(65) Prior Publication Data

US 2023/0311904 A1 Oct. 5, 2023

(51) Int. Cl.
*B60W 40/107* (2012.01)
*B60W 30/14* (2006.01)
*B60W 40/105* (2012.01)
*B60W 50/00* (2006.01)

(52) U.S. Cl.
CPC ........ *B60W 40/107* (2013.01); *B60W 30/143* (2013.01); *B60W 40/105* (2013.01); *B60W 2050/0024* (2013.01); *B60W 2050/0052* (2013.01); *B60W 2420/503* (2013.01); *B60W 2510/081* (2013.01); *B60W 2520/105* (2013.01); *B60W 2520/28* (2013.01); *B60W 2540/18* (2013.01); *B60W 2556/50* (2020.02)

(58) Field of Classification Search
CPC ............. B60W 30/143; B60W 40/105; B60W 40/107; B60W 2050/0024; B60W 2050/0052; B60W 2420/503; B60W 2510/081; B60W 2520/28; B60W 2520/105; B60W 2540/18; B60W 2556/50
See application file for complete search history.

(56) References Cited

U.S. PATENT DOCUMENTS

| | | | | |
|---|---|---|---|---|
| 5,010,489 A | * | 4/1991 | Masaki | ................ B60T 8/1764 |
| | | | | 701/79 |
| 5,563,793 A | * | 10/1996 | Nakaura | ................ B60T 8/172 |
| | | | | 180/197 |
| 5,740,877 A | * | 4/1998 | Sasaki | ................ B60K 23/0808 |
| | | | | 701/69 |

(Continued)

FOREIGN PATENT DOCUMENTS

| | | | | | |
|---|---|---|---|---|---|
| CN | 102673569 A | * | 9/2012 | | |
| CN | 108116417 A | * | 6/2018 | .......... | B60W 40/105 |

(Continued)

*Primary Examiner* — John M Zaleskas (57) ABSTRACT

A longitudinal vehicle speed sensor for a vehicle includes a first sensor configured to generate a first measured speed based on one of a wheel speed of the vehicle receiving output torque from a drive unit and an output of a global positioning system (GPS). A second sensor is configured to generate a second measured speed. A speed weighting module is configured to apply a first weight to the first measured speed to generate a first weighted speed. A speed weighting module is configured to apply a second weight to the second measured speed to generate a second weighted speed. An output module is configured to generate a speed estimate based on the first weighted speed and the second weighted speed.

20 Claims, 9 Drawing Sheets

(56) References Cited

U.S. PATENT DOCUMENTS

| | | | | |
|---|---|---|---|---|
| 6,438,506 B1* | 8/2002 | Yohpe | A01B 63/00 | 701/56 |
| 7,319,927 B1* | 1/2008 | Sun | B60W 10/06 | 701/48 |
| 2007/0005212 A1* | 1/2007 | Xu | B60W 30/045 | 701/45 |
| 2007/0109176 A1* | 5/2007 | Nakanishi | G01S 13/588 | 342/115 |
| 2009/0265073 A1* | 10/2009 | Laiou | G01P 13/00 | 701/93 |
| 2010/0063684 A1* | 3/2010 | Colosky | G01P 3/489 | 701/42 |
| 2010/0222977 A1* | 9/2010 | Tan | B60T 8/172 | 701/72 |
| 2010/0256847 A1* | 10/2010 | Kimbara | B60T 8/172 | 701/22 |
| 2015/0057832 A1* | 2/2015 | Stanek | B60W 40/105 | 701/1 |
| 2019/0202465 A1* | 7/2019 | Kato | G01P 3/50 | |
| 2020/0064139 A1* | 2/2020 | Mieth | G08G 1/096844 | |
| 2020/0269702 A1* | 8/2020 | Meyer | B60L 50/15 | |
| 2021/0237585 A1* | 8/2021 | Miura | B60L 3/104 | |
| 2021/0370958 A1* | 12/2021 | Moshchuk | B60W 40/105 | |
| 2022/0324465 A1* | 10/2022 | Sakagami | B60W 30/18109 | |
| 2023/0051472 A1* | 2/2023 | Lovins-Wilusz | G06F 17/18 | |
| 2023/0382403 A1* | 11/2023 | Tan | B60W 40/06 | |

FOREIGN PATENT DOCUMENTS

| | | | | |
|---|---|---|---|---|
| CN | 111402626 A | * | 7/2020 | G08G 1/052 |
| CN | 112579966 A | * | 3/2021 | |
| CN | 110962859 B | * | 4/2021 | B60W 40/105 |
| CN | 113212441 A | * | 8/2021 | |
| DE | 102007008613 A1 | * | 8/2008 | B60K 6/445 |
| DE | 102011081148 A1 | * | 2/2013 | G08G 1/0112 |
| DE | 102012024632 A1 | * | 6/2014 | B60W 40/105 |
| DE | 102020205690 A1 | * | 11/2021 | |
| FR | 2860073 A1 | * | 3/2005 | B60T 8/172 |
| JP | 2001287559 A | * | 10/2001 | |
| JP | 2019132713 A | * | 8/2019 | |
| WO | WO-2019150483 A1 | * | 8/2019 | |
| WO | WO-2023000145 A1 | * | 1/2023 | |
| WO | WO-2023013566 A1 | * | 2/2023 | |

* cited by examiner

VEHICLE SPEED AND/OR WHEEL SPEED ESTIMATION USING MULTIPLE SPEED MEASUREMENTS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for estimating longitudinal speed vehicle speed for vehicles.

Vehicles typically include wheel speed sensors that measure wheel speeds at the corresponding front and rear wheels. Vehicle speed estimating systems calculate the longitudinal speed of the vehicle based on outputs of the wheel speed sensors. In some situations, however, one or more of the wheel speed sensors may not provide accurate data.

For example, errors in determining the vehicle speed may occur due to unmodeled dynamics, driveline damping, and/or axle/driveline lash. Other vehicle speed errors may be caused by wheel speed sensors that are less accurate at certain speeds such as very low speeds.

Failure to accurately sense vehicle speed at very low speeds can lead to problems for autonomous vehicle applications where an electric motor is used to brake the vehicle to a stop and hold the vehicle until the driver or autonomous vehicle controller accelerates. At less than about 1-3 kilometer per hour (kph), some wheel speed sensors are not as accurate as desired. The electric motor may be used to brake the vehicle to a stop (typically while regenerating) and remain stationary (such as at a traffic light) without applying mechanical brakes. To perform this type of stop, the vehicle controller needs to have a very accurate vehicle speed estimate to control the electric motor without applying the mechanical brakes.

SUMMARY

A longitudinal vehicle speed sensor for a vehicle includes a first sensor configured to generate a first measured speed based on one of a wheel speed of the vehicle receiving output torque from a drive unit and an output of a global positioning system (GPS). A second sensor is configured to generate a second measured speed. A speed weighting module is configured to apply a first weight to the first measured speed to generate a first weighted speed. A speed weighting module is configured to apply a second weight to the second measured speed to generate a second weighted speed. An output module is configured to generate a speed estimate based on the first weighted speed and the second weighted speed.

In other features, the second measured speed is based on a rotational speed of a component of the drive unit. A converting module is configured to scale the second weighted speed based on one or more axle parameters. At least one of the first measured speed and the second measured speed is adjusted based on a steering wheel angle. The axle parameters are based on at least one of a gear ratio and a motor speed to wheel speed factor. The second measured speed corresponds to a rotation speed and further comprising a converting module configured to convert the rotational speed to a wheel speed and the wheel speed to a lateral speed corresponding to the second measured speed.

In other features, a filtering module configured to filter at least one of an output of the speed weighting module and an output of the converting module. The output module comprises a summing module configured to sum the first weighted speed and the second weighted speed. The first weight is in a range from 0 to 1, the second weight is in a range from 0 to 1, and a sum of the first weight and the second weight is equal to 1.

In other features, the drive unit comprises an electric motor and the sensor comprises a motor speed sensor. The drive unit comprises an internal combustion engine and the sensor comprises an engine speed sensor. An averaging module configured to calculate an average speed estimate based on the speed estimate and other wheel speed estimates for other wheels of the vehicle. The averaging module is configured to selectively omit at least one of the speed estimate and the other speed estimates in response to motor lash when calculating the average speed estimate.

In other features, a direction of motion module configured to receive the average speed estimate and at least one of a vehicle acceleration and a motor speed sign and output an estimated longitudinal vehicle speed in response thereto.

In other features, the speed weighting module is configured to determine the first weight in response to at least one of a wheel sensor fault signal and vehicle speed. The speed weighting module is configured to determine the second weight in response to a wheel sensor fault signal and vehicle speed.

A method for generating a longitudinal vehicle speed for a vehicle comprises generating a first measured speed based on one of a wheel speed of the vehicle receiving output torque from a drive unit and an output of a global positioning system (GPS); generating a second measured speed; applying a first weight to the first measured speed to generate a first weighted speed; applying a second weight to the second measured speed to generate a second weighted speed; and generating a speed estimate based on the first weighted speed and the second weighted speed.

In other features, the method includes adjusting the second weighted speed based on one or more axle parameters. The axle parameters are based on at least one of a gear ratio and a motor speed to wheel speed factor. The first weight is in a range from 0 to 1, the second weight is in a range from 0 to 1, and a sum of the first weight and the second weight is equal to 1.

In other features, one of the drive unit comprises an electric motor and the second measured speed corresponds to a motor speed. The drive unit comprises an internal combustion engine and the second measuring speed corresponds to an engine speed.

In other features, the method includes generating an average speed estimate based on the speed estimate for the wheel and other speed estimates for other wheels of the vehicle; selectively omitting at least one of the speed estimate and the other speed estimates in response to motor lash when calculating the average speed estimate; and generating an estimated longitudinal vehicle speed in response to the average speed estimate and at least one of a vehicle acceleration and a motor speed sign.

In other features, the method includes determining the first weight further based on at least one of a wheel sensor fault signal and vehicle speed.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A longitudinal vehicle speed estimating module according to the present disclosure applies a first weight to a first measured speed to generate a first weighted speed and a second weight to a second measured speed from another sensor to generate a second weighted speed. The longitudinal vehicle speed estimate is based on the first weighted speed and the second weighted speed.

In some examples, the first measured speed include a wheel speed generated by a wheel speed sensor. The wheel speed is converted to a linear speed by multiplying the wheel speed by a nominal or learned tire radius. In other examples, the first measured speed may be based on a vehicle speed from a global positioning system (GPS).

Examples of the second measured speed may include motor speed, engine speed, transmission output shaft speed, etc. or a vehicle speed from a global positioning system (GPS) (in the case where wheel speed corresponds to the first measured speed).

When the second measured speed is a rotational speed, the rotational speed is converted to a wheel speed (and/or a linear speed) and optionally filtered. For example, the rotational speed can be based on a motor speed measurement that is mapped to a wheel speed estimate using gear ratios and other driveline characteristics (and/or to a linear speed). A filter such as a low pass filter is optionally used on the to account for unmodeled dynamics, noise, and/or driveline damping. When the motors is in axle/driveline lash, the motor speed can be omitted as will be described further below.

By adjusting the first weight and the second weight, the contribution of the first measured speed and the second measured speed can be adjusted. The first and second weighted speeds are combined or summed.

For example, when the vehicle is travelling at a very slow vehicle speed, the first weight can be set to 0 and the second weight can be set to 1 to eliminate errors that are caused when the wheel speed sensors are operated at the very slow vehicle speed. The first and second weighted speeds can also be adjusted or omitted to eliminate errors caused during lash, sensor faults, or other factors. In some examples, the wheels speeds can also be adjusted based on steering wheel angle.

Weighted speed measurements are generated for the other wheels. The weighted speed measurements are averaged (or combined using another function). Accelerometer measurements or motor direction may be used to determine the actual direction of vehicle motion. The vehicle longitudinal speed estimate is based on the averaged speed measurements and the vehicle direction.

Figure 1A:
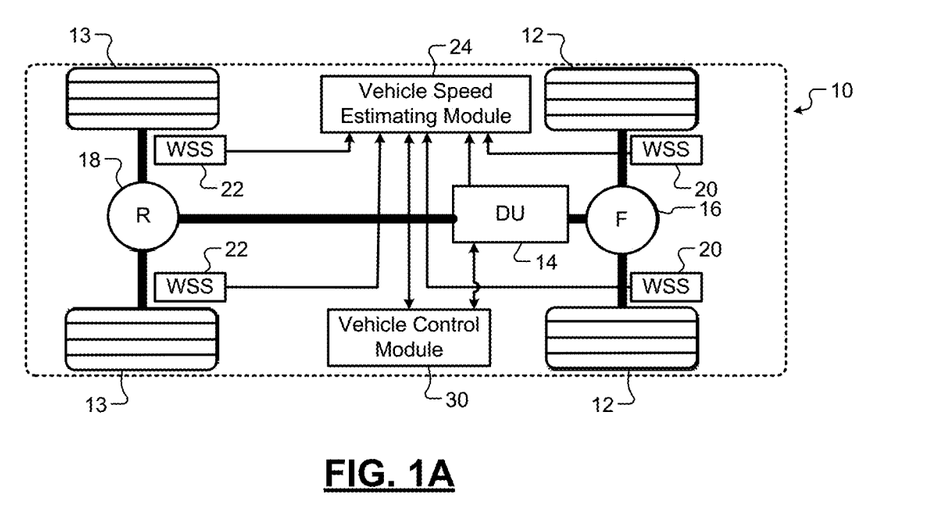
FIG. 1A is a functional block diagram of an example of a vehicle including a vehicle speed estimating module according to the present disclosure.
Figure 1B:
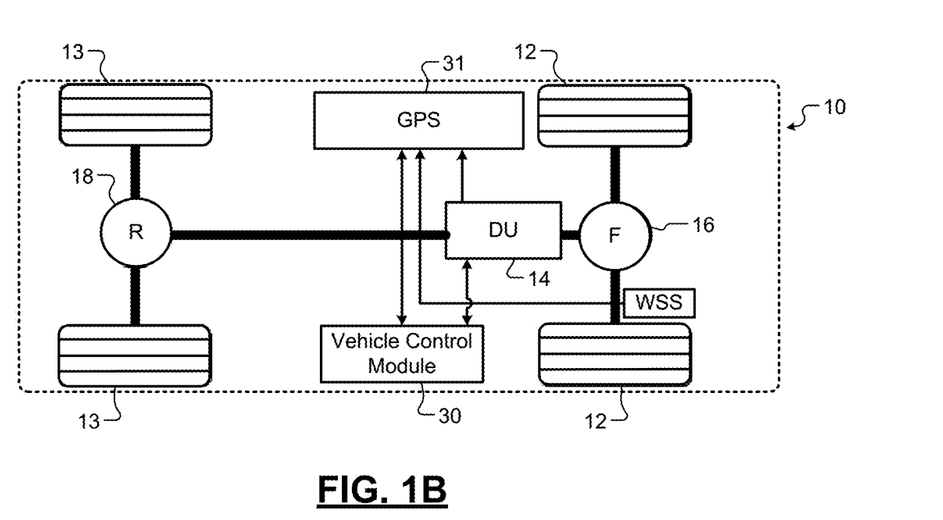
FIG. 1B is a functional block diagram of another example of a vehicle including a vehicle speed estimating module according to the present disclosure.

Referring now to FIGS. 1A and 1B, a vehicle 10 includes front wheels 12 and rear wheels 13. In FIG. 1A, a drive unit 14 selectively outputs torque to the front wheels 12 and/or the rear wheels 13 via drivelines 16, 18, respectively. Wheel speed sensors 20, 22 measure wheel speeds of the front wheels 12 and the rear wheels 13, respectively.

A vehicle speed estimating module 24 receives the wheel speeds from the wheel speed sensors 20, 22 and one or more additional speed sensors as will be described below. As will be described further below, the vehicle speed estimating module 24 outputs a longitudinal vehicle speed to a vehicle control module 30. The vehicle control module 30 varies torque output by the drive unit 14 in response to driver input, an autonomous vehicle control system, a cruise control system or other system. The vehicle control module 30 further controls the drive unit 14 in response to the longitudinal vehicle speed. In FIG. 1B, in some examples the first measured speed (or the second measured speed) can be generated by a global positioning system 31.

Figure 2:
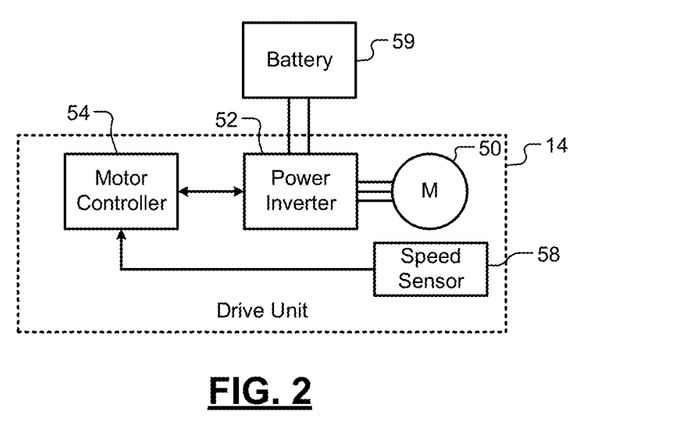
FIG. 2 is a functional block diagram of an example of a drive unit including an electric motor according to the present disclosure.
Figure 3:
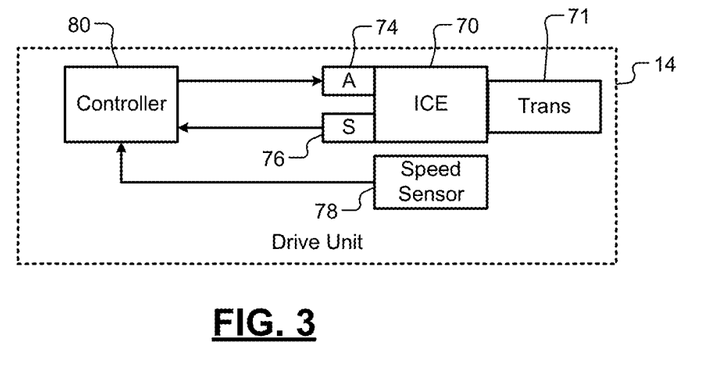
FIG. 3 is a functional block diagram of an example of a drive unit including an internal combustion engine (ICE) according to the present disclosure.

Referring now to FIGS. 2 and 3, the vehicle 10 may include different types of drive units. For example, the vehicle 10 may be an electric vehicle (EV) such as a battery electric vehicle (BEV), a hybrid vehicle, or a fuel cell vehicle, a vehicle including an internal combustion engine (ICE), or other type of vehicle. For purposes of illustration, drive units including an electric motor or an internal combustion engine will be described below.

In FIG. 2, a simplified example of the drive unit 14 for an electric vehicle is shown. The drive unit 14 includes an electric motor 50, a power inverter 52, a motor controller 54 and a motor speed sensor 58. The motor controller 54 controls power switches within the power inverter 52 to adjust the motor speed and torque during propulsion and/or regeneration. A battery system 59 provides power to or receives power from the electric motor 50 via the power inverter 52 during propulsion or regeneration. The motor speed sensor 58 outputs a motor speed signal based on a rotational speed of the electric motor 50.

In FIG. 3, a simplified example of the drive unit 14 including an internal combustion engine (ICE) is shown. The drive unit 14 includes an internal combustion engine (ICE) 70, a transmission 71, one or more actuators 74 (such as a fuel delivery system, spark control system, etc.) and one or more sensors 76 (such as pressure sensors, temperature sensors, oxygen sensors, etc.). A speed sensor 78 senses a rotational speed of the internal combustion engine 70 or a rotating component of the transmission 71.

As will be described more fully below, the vehicle speed estimating module according to the present disclosure combines the first measured speed and the second measured speed to provide a more accurate longitudinal vehicle speed as will be described further below.

Figure 4:
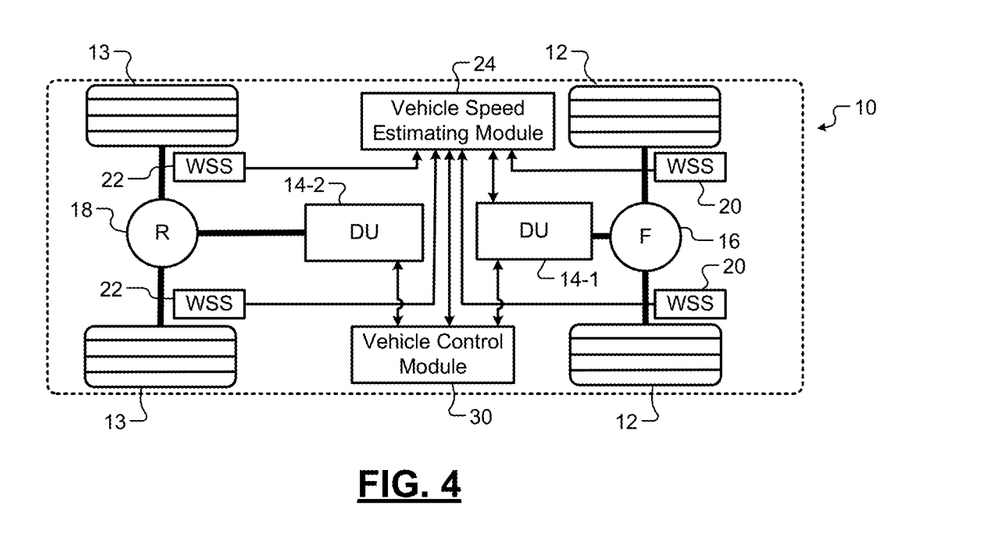
FIGS. 4-6 are functional block diagrams of other examples of vehicles including vehicle speed estimating modules according to the present disclosure.
Figure 5:
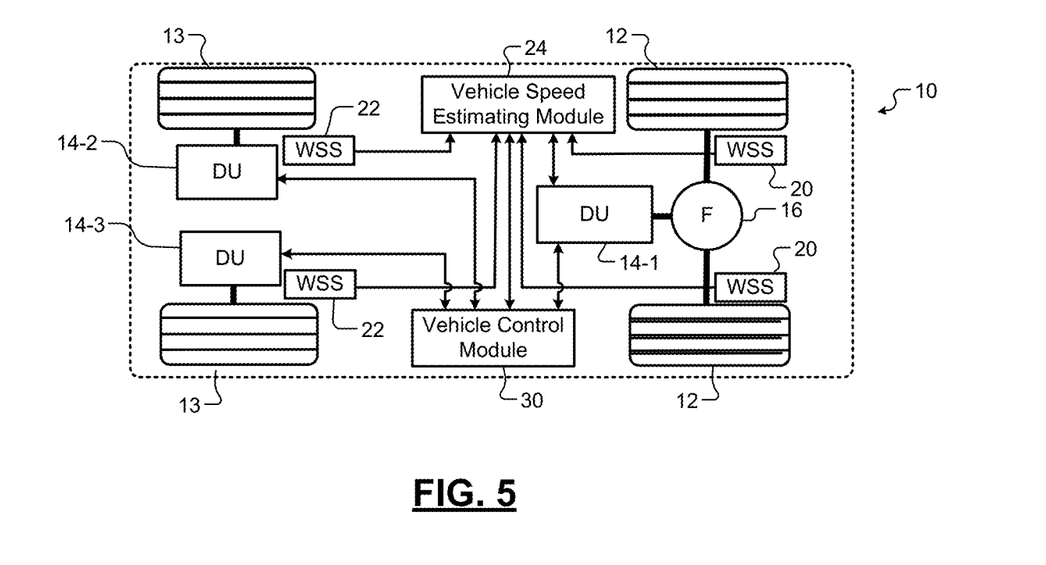
Figure 6:
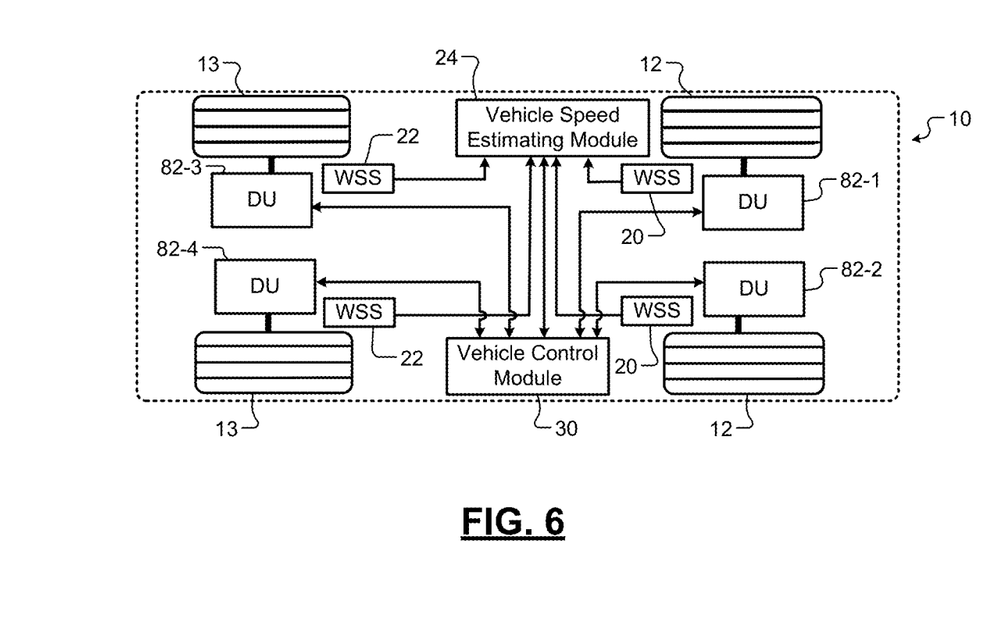

While the vehicle 10 includes a single drive unit in FIG. 1, the vehicle 10 may have other configurations (non-limiting examples of which are shown in FIGS. 4-6). In FIG. 4, a drive unit 14-1 drives the front wheels 12 and a drive unit 14-2 drives the rear wheels 13. In FIG. 5, a drive unit 14-1 drives the front wheels 12 and drive units 14-2 and 14-3 individually drive the rear wheels 13. In FIG. 6, drive units 82-1 and 82-2 individually drive the front wheels 12 and drive units 82-3 and 82-4 individually drive the rear wheels 13. As can be appreciated, other vehicle configurations and/or drive units can be used.

Figure 7A:
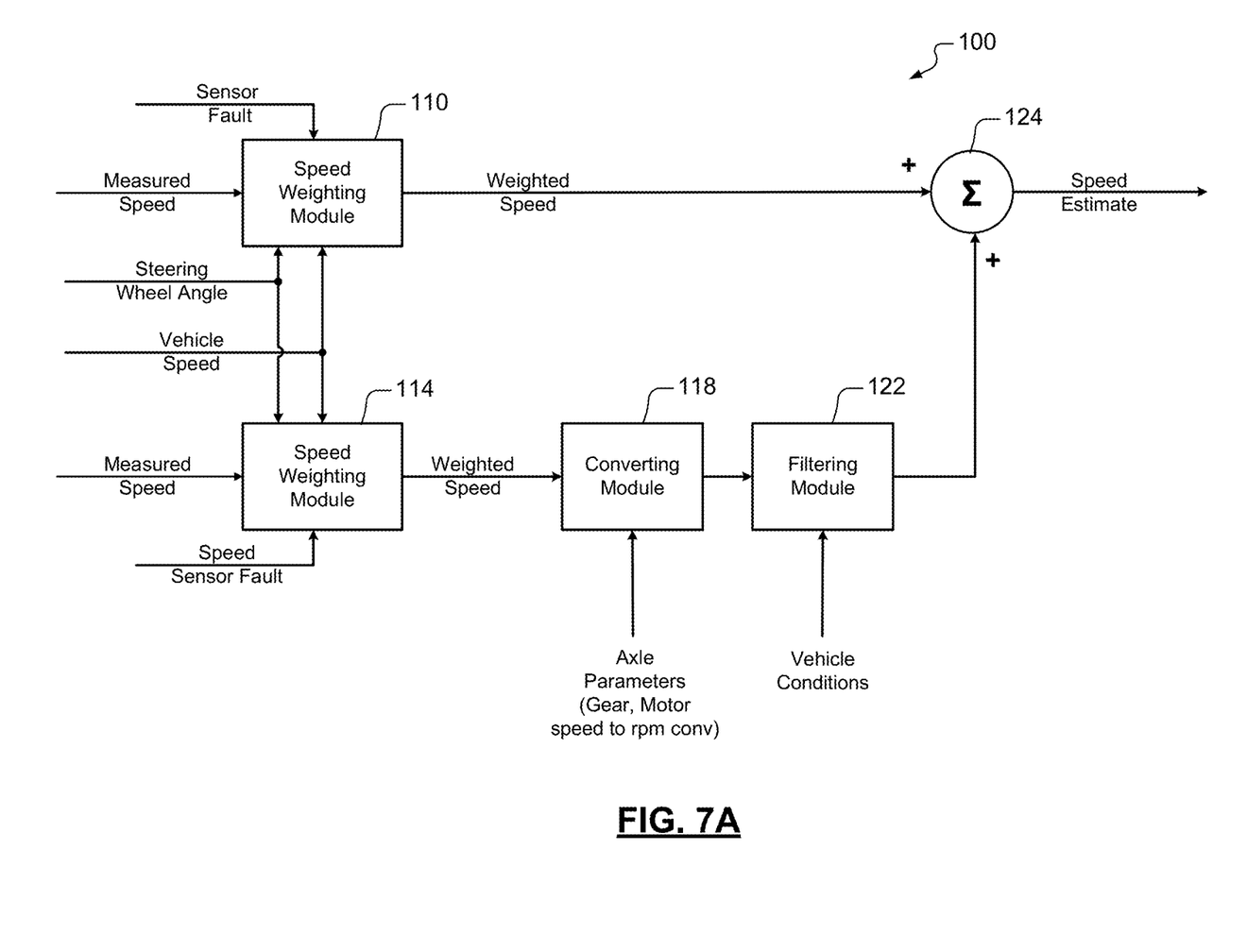
FIGS. 7A to 7C are functional block diagrams of various examples of wheel speed estimating modules according to the present disclosure.
Figure 7B:
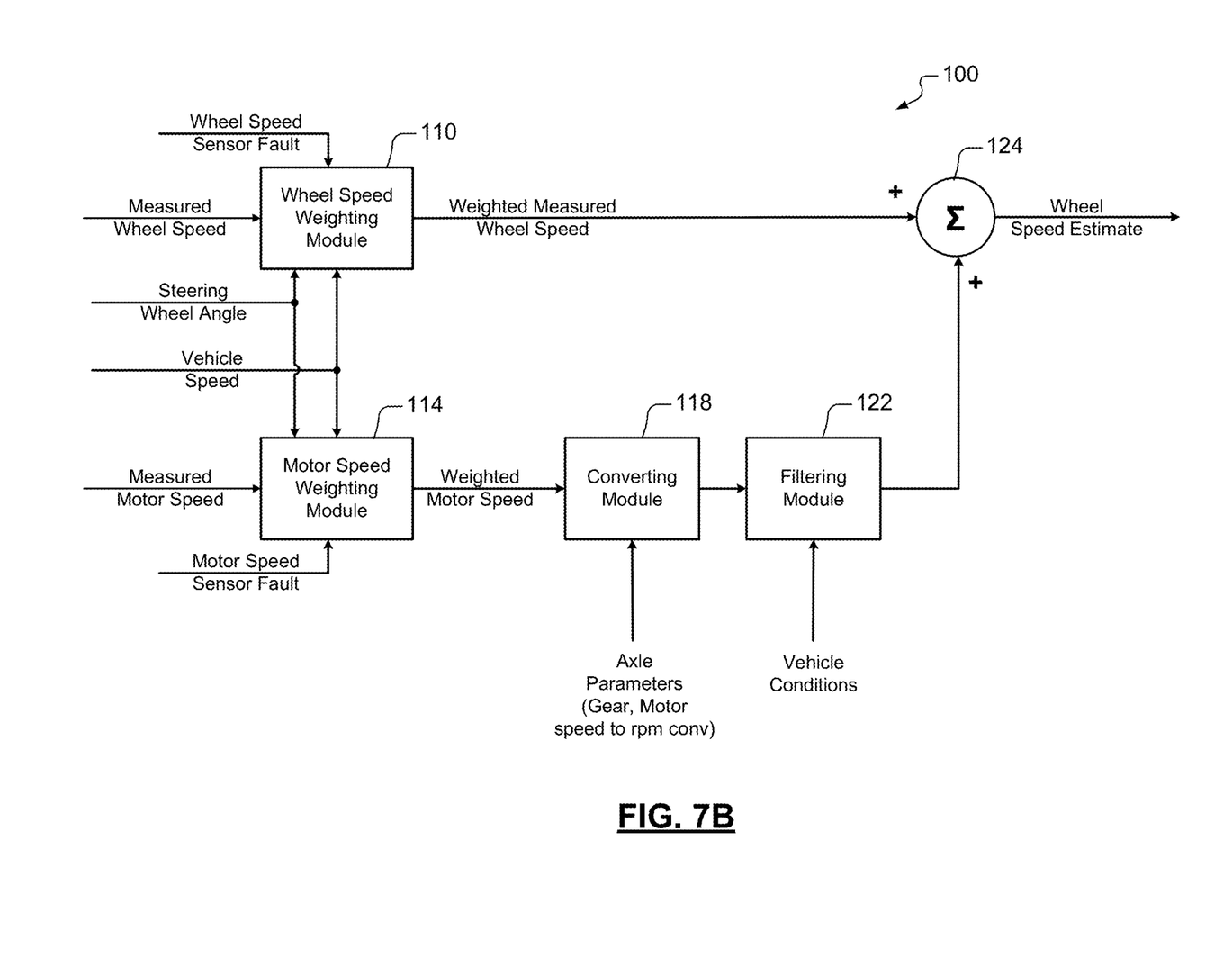
Figure 7C:
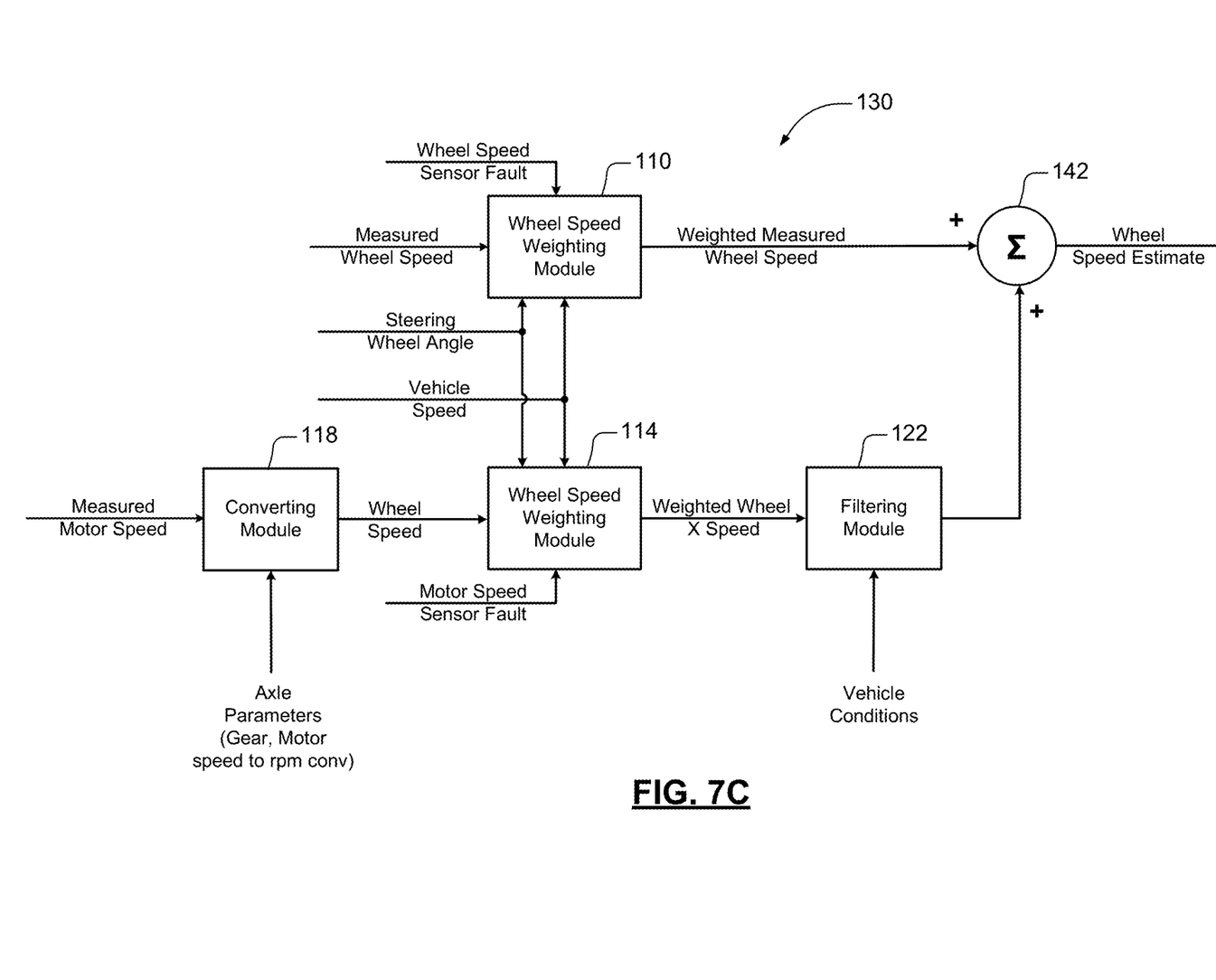

Referring now to FIGS. 7A to 7C, examples of wheel speed estimating modules that combine the first measured speed and the second measured speed are shown. A speed estimating module 100 includes a speed weighting module 110 that receives a first measured speed (for example, from the wheel speed sensors 20, 22 or from the GPS 31). In some examples, the speed weighting module 110 receives the measured wheel speed, converts it to a lateral speed as described above and selectively adjusts a first weight applied to the longitudinal speed based on one or more input signals. In other examples, the speed weighting module 110 receives the first measured speed from the GPS and selectively adjusts a first weight applied to the first measured speed based on one or more input signals.

In some examples, the one or more input signals may include a steering wheel angle (SWA), a vehicle speed and/or a sensor fault signal. The speed weighting module 110 adjusts the first weight based on the one or more inputs and applies the first weight to the first measured speed.

For example when the sensor fault signal is asserted (for example due to a wheel speed sensor fault or a GPS fault), the speed weighting module 110 may reduce the first weight of the first measured speed. In some examples, the first weight can be set to zero or another value when the sensor fault for the corresponding speed sensor is asserted. Alternatively, the first weight may be set to different values depending upon the type of fault. For example, some types of faults may be associated with zero while other types of faults may be set to 25% or another value.

For example, the steering wheel angle can be used to adjust or compensate the wheel speed during turning. In a one motor configuration (e.g. rear), the motor speed measurement is adjusted based on how much the vehicle is turning. In some examples, an operational lookup table that is indexed by the steering wheel angle can be used to generate the weight. In other examples, the projection on a left front wheel can be based on $V_{wLF}=(V_x-r*T_f/2)*\cos\delta+(V_y+L_1*r)*\sin\delta$ (where Tf, $L_1$ are vehicle geometric dimensions, $V_x$ is the converted linear speed at the rear axle (motor speed), r is the rotation rate, and delta is the steering angle, $V_y$ is the measured lateral speed and $V_y$ can be approximated by multiplying $L_2$ by r).

For example, when the vehicle speed is less than a predetermined vehicle speed, the speed weighting module 110 may reduce the first weight of the first measured speed when wheel speed sensors are used. When the vehicle speed is greater than a predetermined vehicle speed, the speed weighting module 110 increases the first weight of the wheel speed sensor. This allows increased reliance to be placed on the wheel speed derived based on the second measured speed, which improves accuracy.

In some examples using wheel speed sensors, the first weight of the measured wheel speed is reduced to zero or another low weight when the vehicle speed is less than the predetermined vehicle speed such as 1 kph, 2 kph, 3, kph, 5 kph or another vehicle speed. When the vehicle speed is greater than the predetermined vehicle speed, the first weight of the first measured speed is increased.

The speed estimating module 100 further includes a speed weighting module 114 that receives the second measured speed. In some examples, the second measured speed includes a rotational speed that is related to a rotating component of the drive unit such as motor or engine speed. Other rotational speeds may be used such as a transmission output shaft speed or another rotational speed based on rotation of a driveline component. The speed weighting module 114 receives one or more other input signals and selectively adjusts a second weight applied to the second measured speed based the one or more input signals.

The speed estimating module 100 further includes a converting module 118 that receives the output of the speed weighting module 114. The converting module 118 receives axle parameters such as a selected gear ratio, a motor speed to RPM converting factor and/or other axle parameters. The converting module 118 converts the rotational speed to a wheel speed and the wheel speed to a lateral speed. An output of the converting module is input to a filtering module 122.

The filtering module 122 selectively applies a low pass filter, a bandpass filter or high pass filter based on one or more vehicle conditions. For example, a low pass filter may be used to eliminate noise during certain modes of operation. For example, filtering may be used when the vehicle speed is lower than a predetermined speed.

The speed weighting module 110 outputs the first weighted speed to a first input of a combining module 124. The filtering module 122 outputs the second weighted speed to a second input of the combining module 124. The combining module 124 combines the first weighted speed and the second weighted speed to generate a weighted speed estimate for a corresponding one of the wheels. In some examples, the combining module 124 includes a summer that adds the first weighted speed and the second weighted speed to generate the weighted speed estimate, although other functions can be used. In some examples, the first weight and the second weight are in a range from 0 to 1 and a sum of the first weight and the second weight is equal to 1.

In some examples, additional speed estimating modules 100 are associated with one or more of the other wheels of the vehicle (and corresponding drive units if applicable) and operate in a similar manner. In some examples, the vehicle 10 includes four wheels and four of the speed estimating modules 100 are used.

In FIG. 7B, the second measured speed can be a measured motor speed and the speed weighting module 114 can be a motor speed weighting module as shown.

In FIG. 7C, one or more components of the speed estimating module 100 can be rearranged. For example, the converting module 118 can be arranged before the speed weighting module 114 and/or the filtering module 122 can be arranged after the speed weighting module 114. As can be appreciated, both the converting module 118 and the filtering module 122 can be arranged prior to the speed weighting module 114 and/or the filtering module 122 can be arranged prior to the speed weighting module 114 and the converting module 118 can be arranged after the speed weighting module 114.

Figure 8:
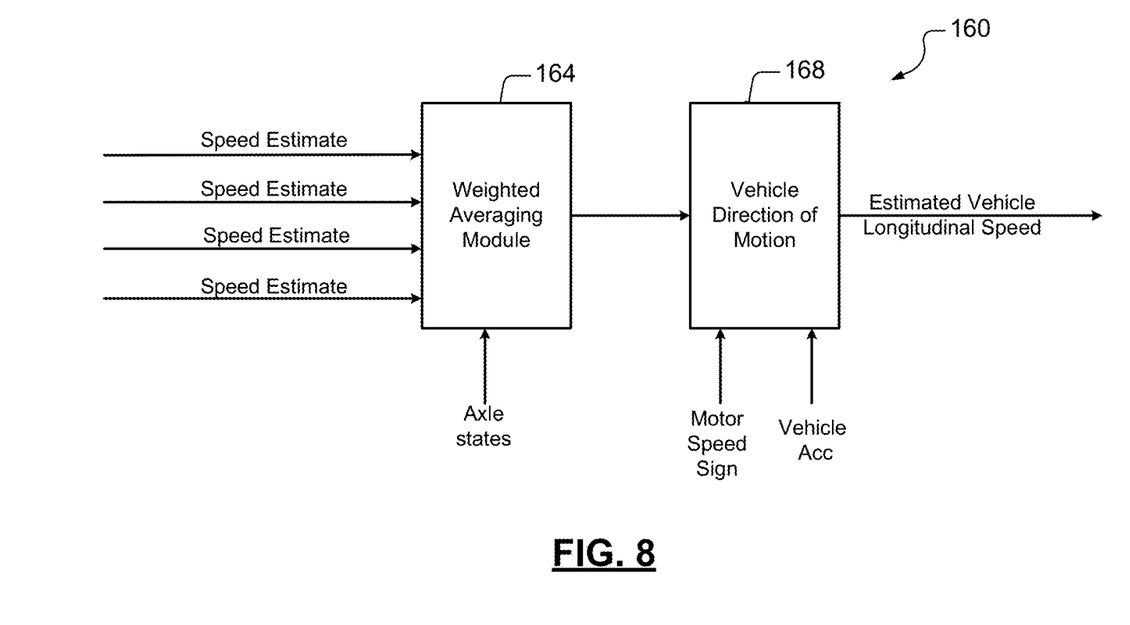
FIG. 8 is a functional block diagram of an example of vehicle speed estimating module according to the present disclosure.

Referring now to FIG. 8, a vehicle speed estimating module 160 is shown. Weighted speed estimates for each wheel (output by the corresponding speed estimating modules 100) are input to a weighted averaging module 164. In some examples, weighted speed estimates are averaged to generate an average weighted speed, although other functions can be used.

In some examples, axle states are an input into the weighted averaging module 164. Depending upon the axle state, one or more speed estimates can be omitted from the average if the corresponding axle/wheel is in lash. When the speed estimate is primarily based on the motor speed, the estimate is sensitive to axle lash. During normal operation, all of the wheel estimates are used. However, when the rear axle is going through lash, that estimate is not used. Once the lash transition is complete, the wheel speed estimate from that axle is used again in the averaging function.

The average weighted speed output by the weighted averaging module 164 is input to a direction of motion module 168. In some examples, the direction of motion module 168 receives one or more other input signals used to determine vehicle direction. Examples of the input signals include a motor speed sign and a vehicle acceleration. The direction of motion module 168 outputs an estimated vehicle longitudinal speed based on the weighted speed estimates and the one or more other input signals.

Figure 9:
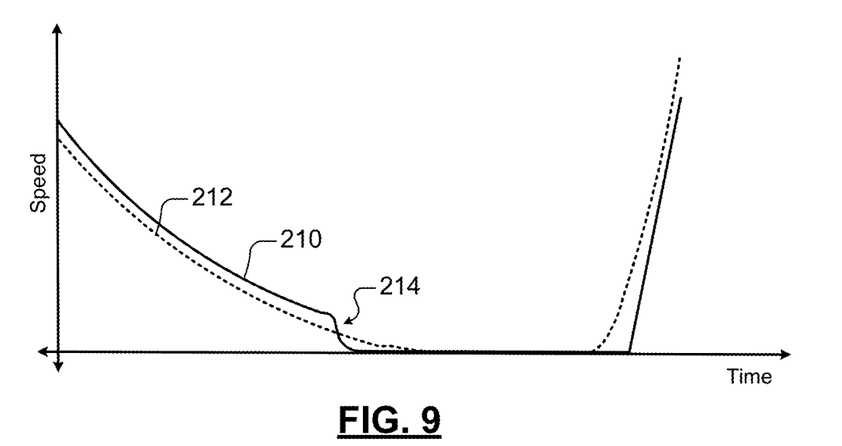
FIG. 9 is a graph illustrating vehicle speed as a function of time without using the vehicle speed estimating module according to the present disclosure.

Referring now to FIG. 9, a graph illustrating vehicle speed as a function of time (without using the vehicle speed estimating module) is shown. In FIG. 9, an example shows vehicle speed estimate drop that occurs in response to wheel speed sensor drop out. In FIG. 9, true vehicle speed 212 decreases to zero and then increases. A vehicle speed estimate 210 is shown and is based on wheel speed sensors. At low vehicle speeds, the wheel speed sensor may drop out and cause the vehicle speed to prematurely fall to zero despite the true vehicle speed being greater than zero. As described above, incorrect vehicle speed estimates may cause vehicle control issues. In other examples, lash in the motor may cause a noisy signal for the speed estimate based on motor speed, which also causes a noisy vehicle longitudinal speed estimate.

Figure 10:
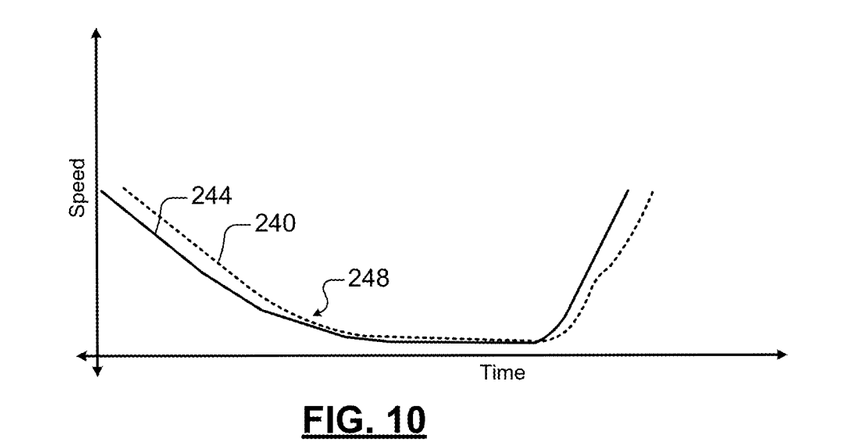
FIG. 10 is a graph illustrating vehicle speed as a function of time using the vehicle speed estimating module according to the present disclosure.

Referring now to FIG. 10, a graph illustrates vehicle speed as a function of time using the vehicle speed estimating module according to the present disclosure. A vehicle longitudinal speed estimate 240 uses both motor speed and a rotational speed to determine the weighted speed estimate for a given wheel. In FIG. 10, a true longitudinal vehicle speed 244 is shown. By using the first measured speed in combination with the second measured speed and selectively adjusting the weights in response to low vehicle speed, axle lash, or other events, disturbances can be reduced/eliminated and a more accurate vehicle longitudinal speed estimate can be generated.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A longitudinal vehicle speed sensor for a vehicle, comprising:
    a first sensor configured to generate a first measured speed based on one of:
        a wheel speed for a wheel of the vehicle receiving output torque from a motor; and
        an output of a global positioning system (GPS);
    a second sensor configured to generate a second measured speed;
    a first speed weighting circuit configured to apply a first weight to the first measured speed to generate a first weighted speed;
    a second speed weighting circuit configured to apply a second weight to the second measured speed to generate a second weighted speed;
    an output circuit configured to generate a speed estimate for the wheel of the vehicle based on the first weighted speed and the second weighted speed; and
    an averaging circuit configured to calculate an average speed estimate based on the speed estimate and other wheel speed estimates for other wheels of the vehicle, wherein the averaging circuit is configured to selectively omit at least one of the speed estimate and the other wheel speed estimates in response to motor lash when calculating the average speed estimate.

2. The longitudinal vehicle speed sensor of claim 1, wherein the second measured speed is based on a rotational speed of the motor.

3. The longitudinal vehicle speed sensor of claim 2, wherein at least one of the first measured speed and the second measured speed is adjusted based on a steering wheel angle.

4. The longitudinal vehicle speed sensor of claim 1, further comprising a converting circuit configured to scale the second weighted speed based on one or more axle parameters.

5. The longitudinal vehicle speed sensor of claim 4, wherein the one or more axle parameters are based on at least one of a gear ratio and a motor speed to wheel speed factor.

6. The longitudinal vehicle speed sensor of claim 4, further comprising a filtering circuit configured to filter at least one of an output of the second speed weighting circuit and an output of the converting circuit.

7. The longitudinal vehicle speed sensor of claim 1, wherein the second measured speed corresponds to a rotational speed and further comprising:
    a converting circuit configured to convert the rotational speed to a wheel speed and the wheel speed to a lateral speed corresponding to the second measured speed.

8. The longitudinal vehicle speed sensor of claim 1, wherein:
    the output circuit comprises a summing circuit configured to sum the first weighted speed and the second weighted speed; and
    the first weight is in a range from 0 to 1, the second weight is in a range from 0 to 1, and a sum of the first weight and the second weight is equal to 1.

9. The longitudinal vehicle speed sensor of claim 1, wherein the motor comprises an electric motor and the second sensor comprises a motor speed sensor.

10. The longitudinal vehicle speed sensor of claim 1, wherein the motor comprises an internal combustion engine and the second sensor comprises an engine speed sensor.

11. The longitudinal vehicle speed sensor of claim 1, further comprising a direction of motion circuit configured to:
    receive the average speed estimate and at least one of a vehicle acceleration and a motor speed sign; and
    output an estimated longitudinal vehicle speed in response thereto.

12. The longitudinal vehicle speed sensor of claim 1, wherein the first speed weighting circuit is configured to determine the first weight in response to at least one of a wheel sensor fault signal and a vehicle speed.

13. The longitudinal vehicle speed sensor of claim 1, wherein the second speed weighting circuit is configured to determine the second weight in response to a wheel sensor fault signal and a vehicle speed.

14. The longitudinal vehicle speed sensor of claim 1, further comprising a filtering circuit configured to filter an output of the second speed weighting circuit.

15. A method for generating a longitudinal vehicle speed for a vehicle, comprising:
- generating a first measured speed based on one of:
  - a wheel speed for a wheel of the vehicle receiving output torque from a motor of the vehicle; and
  - an output of a global positioning system (GPS);
- generating a second measured speed;
- applying a first weight to the first measured speed to generate a first weighted speed;
- applying a second weight to the second measured speed to generate a second weighted speed;
- generating a speed estimate for the wheel of the vehicle based on the first weighted speed and the second weighted speed;
- generating other speed estimates for other wheels of the vehicle;
- generating an average speed estimate based on the speed estimate for the wheel and the other speed estimates for the other wheels of the vehicle, including omitting at least one of the speed estimate for the wheel and the other speed estimates for the other wheels when generating the average speed estimate;
- generating an estimated longitudinal vehicle speed based on the average speed estimate and at least one of a vehicle acceleration and a motor speed sign; and
- controlling the motor of the vehicle in response to the generated estimated longitudinal vehicle speed.

16. The method of claim 15, further comprising:
adjusting the second weighted speed based on one or more axle parameters,
wherein the one or more axle parameters are based on at least one of a gear ratio and a motor speed to wheel speed factor.

17. The method of claim 15, wherein the first weight is in a range from 0 to 1, the second weight is in a range from 0 to 1, and a sum of the first weight and the second weight is equal to 1.

18. The method of claim 15, wherein the motor comprises an electric motor and the second measured speed corresponds to a motor speed.

19. The method of claim 15, further comprising determining the first weight based on at least one of a wheel sensor fault signal and a vehicle speed.

20. The method of claim 15, wherein the motor comprises an internal combustion engine and the second measured speed corresponds to an engine speed.

* * * * *